(No Model.)
W. L. GATES.
AUTOMATIC INSTRUCTOR.
No. 319,224. Patented June 2, 1885.
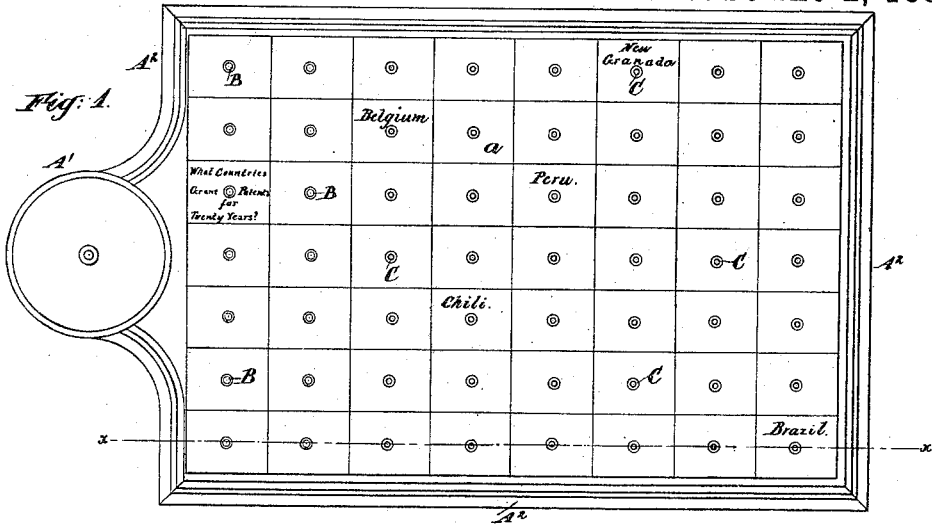
Fig. 1.
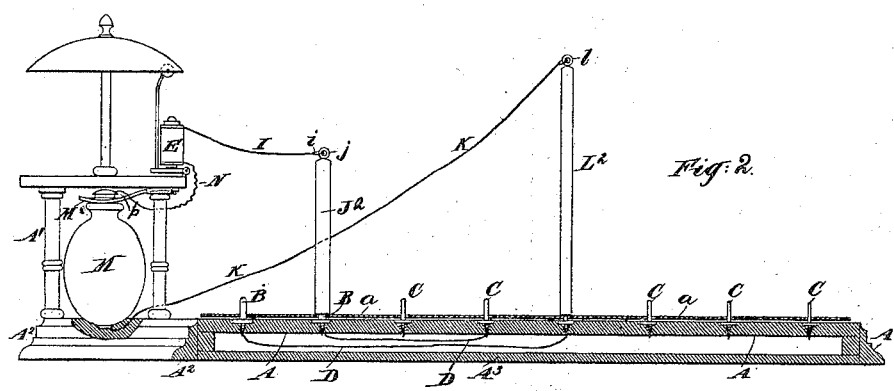
Fig. 2.
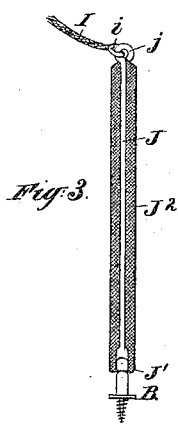
Fig. 3.
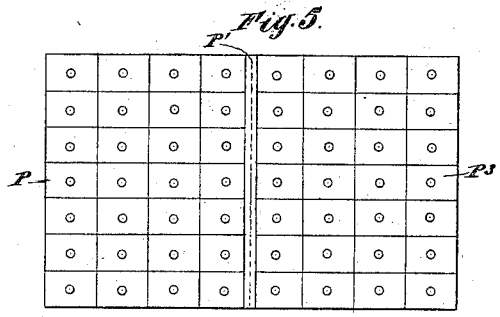
Fig. 5.
Fig. 6.
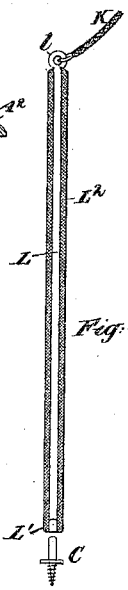
Fig. 4.
Witnesses:
Charles R. Searle,
H. A. Johnstone.
Inventor:
Waldo L. Gates,
by his attorney
Thomas Drew Stetson.
N. PETERS, Photo-Lithographer, Washington, D. C.

UNITED STATES PATENT OFFICE.

WALDO L. GATES, OF BAYONNE, NEW JERSEY, ASSIGNOR, BY MESNE ASSIGNMENTS, TO THE ELECTRIC AUTOMATIC INSTRUCTOR COMPANY, OF PORTLAND, MAINE.

AUTOMATIC INSTRUCTOR.

SPECIFICATION forming part of Letters Patent No. 319,224, dated June 2, 1885.

Application filed November 24, 1884. (No model.)

*To all whom it may concern:*

Be it known that I, WALDO L. GATES, of Bayonne, in the county of Hudson and State of New Jersey, have invented a certain new and improved device which I term an Automatic Instructor, of which the following is a specification.

It is adapted, by the aid of a small electric bell and a small galvanic battery and short flexible wires, to indicate, by the striking of the bell, when the right answer is given to a question. Twenty or some other number of questions are printed up and down one edge of a board or over a certain area of the board. The correct answers to the questions are printed on other portions of the board. Each question and answer is adjacent to a copper or other metallic pin projecting a little above, and which leads through the board to the back, and thence by smaller wires attached thereto connects across the back between each question-pin and the proper answer-pin, the conductors being insulated, so that there is no other communication.

In certain lines of inquiry the printed face for the answers may be a map, which is pasted or otherwise fixed on the board, and the pins may stand on points corresponding to towns, battles, mines, quarries, bridges, railroad centers, or special agricultural or other industrial districts.

I have devised removable printed sheets of paper or analogous material punched to match over the pins on the face of the board, so as to change the questions and answers indefinitely with the same pins and connections. In what I esteem the most complete form of the invention the removable sheets are printed on both sides, and each face thereof is provided with a turning flap, which greatly increases the capacity of a given quantity of the apparatus. There may be a series of questions and answers on one half of one face of each sheet of paper and on one face of the attached flap. There may be another series on the other face of the attached flap and the other half of the same face of the paper, thus giving two sets on one face. There may be a corresponding movable flap on the other side, thus making two sets on that side of the paper or card.

In cases where there are several answers—as to the question "Who represented the United States in the treaty of Washington on the Alabama claims in 1871?"—there may be five conductors from the pin representing the question to the several pins representing the answers; or, more simply and equally effective, a single wire may lead from the pin representing the question to the several pins representing the five answers successively in any order which may be most convenient.

One person, the questioner, but not necessarily well informed, applies a socket-piece connected by one of the flexible wires to the helix of the electric bell, and through it to one of the poles of the battery. He applies the socket-piece upon the question-pin connected with the question which he wishes to ask. Another person, the answerer, who may be either more or less informed than the other, holds a socket-piece connected by a flexible wire to the opposite pole of the battery. With it he covers or matches the answer-pin on the board, which is associated with, adjacent to, or surrounded by the answer which he elects to give. Whenever he matches the right pin, the bell strikes, because the circuit is completed through a wire across the back of the board between that pin and the pin adjacent to the question. Whenever he touches a wrong one, he produces no result, because there is no electrical connection.

I have devised an arrangement of the battery and its adjuncts in immediate and rigid connection with the board, so as to constitute a single piece of apparatus.

The accompanying drawings form a part of this specification, and represent one of the means of successfully carrying out this invention.

Figure 1 is a plan view. Fig. 2 is a partial side elevation and vertical section. The section is taken on the line $x\ x$ in Fig. 1. Figs. 3 and 4 are longitudinal vertical sections of portions on a larger scale. Figs. 5 and 6 are on a much smaller scale. They show a part detached. Fig. 5 is a face view, and Fig. 6 an edge view.

Similar letters of reference indicate corresponding parts in all the figures where they occur.

A is a board of well-seasoned wood, having at one side or end an elevation, A', adapted to receive a galvanic battery, of which see a description further on. The best construction of the board is obtained by gluing together three or other number of thin layers, with the grain of each extending crosswise to the grain of the next. On one face is pasted an elaborately-printed sheet of paper, $a$. This may be printed from a finely-engraved steel or copper plate.

The back of the board is provided with edge strips $A^2$, and a back shield-plate, $A^3$, mounted at a sufficient distance from the main body A of the board to protect the pins and wires arranged between.

B and C are metallic pins, each projecting upward, as shown, and extending through the board A from the face $a$ to the opposite face, which latter I will term the "back" of the board. Each is a screw set in a corresponding hole in the wood, with a collar to gage the depth to which it is inserted. The largest pins B are used for the questions. The questions are printed along one edge or along two or all the edges of the board. There is one conductor or pin B for each question. It is inserted in the midst of the question or immediately at the edge, so that there can be no mistaking the question to which it belongs.

The smaller pins, C, are for the answers. One pin C is inserted at each point in the map or at each point where the answer is printed in words or figures on the board. Each conductor B and C extends through the board and a little distance beyond, so as to project from the back face.

An insulated wire, D, is soldered to the back end of each question-conductor B, and also to the answer-pin C which corresponds thereto. By using wires D which are coated with an insulating material over a great portion of their length, these wires may cross each other indefinitely without inducing any mischief.

The small answer-pins C may be aggregated very closely together, as may be sometimes desirable on a map to indicate points in the neighborhood of the principal cities, dangerous reefs, or the like.

M is a battery. I have used in my experiments the sealed battery patented to Wm. F. McGinnis, March 25, 1884, No. 209,574. A sufficient cavity is provided in the elevation A' to receive the battery. It is retained by a spring-catch, $M^*$.

N is a copper wire leading from the positive pole $p$ of the battery to the helix E. A foot and a half or other convenient length of flexible insulated copper wire, I, connects to the other end of the helix E, and terminates in a link or loop, $i$, which is electrically connected to an eye, $j$, in a metal pin, J, which is equipped with a hard-rubber handle, $J^2$. The lower or working end of the pin is also covered with a hard-rubber tube, J', which projects beyond it, forming a non-conducting socket, with a conductor, J, in the cavity. The questioner seizes the handle, and by its means applies the socket-piece J J' upon one of the question-conductors B. He may retain his hold on the handle or leave it. His applying it on the question-conductor B indicates that that is the question asked. The question may be read aloud in addition, if preferred. That question-conductor is now in connection, through the electrical bell, with the positive pole of the battery, and one or more corresponding answer-pins C are also so connected by means of the wire D, extending across the back; but no current flows, and the bell does not strike, because there is no connection between the answer-conductor C and the negative pole of the battery. It devolves on the other operator to make such connection.

K is a flexible insulated copper wire, with one end electrically connected to the negative plate or pole of the battery. The other end is linked to an eye, $l$, on a socket-piece, L L', which is provided with a handle, $L^2$, of hard rubber or other suitable insulating material. This handle may be larger than the other. I propose to make it generally about the size and length of a pen-holder. The tube L' is of hard rubber. The central pin, L, connected to the battery, is of metal. The operator who is to make the answers takes hold of the handle $L^2$, and applies the tube L' to the specific answer-pin C which he chooses to indicate for the answer. If wrong, he may shift the tube L', applying it in succession to a number of the answer-pins C. The application of the socket-piece L L' produces no effect until it has been completely applied on a pin C, so that the latter touches the metallic pin L in the cavity of the socket-piece. When it is thus applied upon the wrong pin, no result is observed; but the moment the answerer applies the socket-piece L L' properly on the pin C corresponding with the right answer to the question, the electric circuit is completed, the electric current flows through the helix E, and the bell strikes.

I term this an "automatic teacher," because it will speak clearly to indicate the correct answer without requiring any effort of the operator. It may serve as a game at which a number may play, making rules to determine how many trials each may make to hit the correct answer. The device will serve successfully without either the questioner or answerer previously possessing the information called for.

I give the preference to the McGinnis or analogous sealed battery, or some form of dry battery, because it allows the board to be inclined or completely reversed without in any wise deranging the battery.

The invention is capable of a great variety of applications. Instead of maps, answers in words may be printed in squares or in various regular or irregular areas on the board. After the pins are set for a map, other papers, $a'$, may be printed containing entirely different questions, not relating to that map or to that line of inquiry, and holes punched in such paper corresponding to the irregularly-distributed answer-pins, and answers being printed around or otherwise plainly associated with such pins, the same board and connections may, by a little ingenuity in arranging, be made to serve for an indefinite series of questions and answers.

Fig. 5 is a face view, and Fig. 6 an edge view, showing a sheet of stout paper of the proper size to cover the board, and having a flap on each side, one edge of which is attached to a narrow strip of muslin or other tough flexible material pasted up and down the middle. This I esteem the most complete form of the removable attachments for use in this connection. The main body of each sheet of paper and the flaps should be punched to correspond with the pins in the board, and for this use the pins in the main board should be located symmetrically.

P is the sheet of paper or pasteboard. It may be of the fine, tough material known as "bristol-board."

$P'$ $P^2$ are narrow strips of muslin—one glued or otherwise secured up and down the middle of each face—and $P^3$ $P^4$ are pieces of paper, preferably well-sized firm linen paper, each one-half the size of the sheet P, and glued by one edge to one of the strips of muslin $P'$ $P^2$. The bristol-board P and the paper flaps $P^3$ $P^4$ are all punched or otherwise smoothly perforated, the holes being arranged to correspond with the pins B and C in the board, whether the flaps are turned in one direction or the other.

To use this part of the apparatus, one set of questions is printed on the first half of one face of the bristol-board P. The corresponding answers are printed on the adjacent face of the corresponding flap, $P^3$. Another set of questions is printed on the other face of the same flap $P^3$, and the answers corresponding thereto are printed on the remaining half of the same face of the bristol-board. The other face of the board and its flap are correspondingly printed. Thus four complete sets of questions and answers are carried on one of the pieces of bristol-board P and its attachments, and the whole are attached and detached together by a single operation, carefully matching each upon the board A' and its attached pins B and C.

Modifications may be made in the details. Parts of the invention may be used without the whole. It is not essential that the answer-socket have a non-conducting rim or tube, L', adapted to engage on the proper answer-pin C. It may be otherwise formed, and the answerer may merely touch a knob. It is more important, but still not absolutely essential to some degree of success, that the question-socket be adapted to engage and remain locked on its proper question-pin B. I much prefer the capacity for locking these parts together, as shown, because otherwise a little carelessness or trickiness on the part of the questioner, by allowing J to slip from B, might defeat the operation, even when the answerer touches the right answer-pin C.

There is an advantage in having the answerer operate by a deep socket with a non-conducting edge, L'. With an ordinary wire or knob terminal on the piece held in his hand, he could run rapidly through the whole series of pins and defeat the object of the study or game. The socket compels him to apply the device with considerable formality upon the pin which he selects, in order that the bell shall speak even when he selects the right pin.

I can, instead of producing a hole in the question-socket J, form each pin B with a hole, and adapt the movable question-piece J to fit within it. When the end of the question-piece J is socket-formed, as shown, it is not essential that the rim be non-conducting. Tolerably good effects can be produced by making the rim J' of metal, because this, the question-piece, unlike the answer-piece L, will be usually applied under such circumstances that it is immaterial whether its rim is a conductor or not. The bell will not speak unless the answer-piece L is already on the proper answer-pin, which will rarely occur in practice.

I claim as my invention—

1. The board A, carrying questions and answers, in combination with pins or conductors B C, and with wires D, electrically connected thereto, and with the battery M, conductors I K, and bell E, arranged to give intelligent answers to questions, as herein specified.

2. The question-conductors B, in combination with the board A and means, as J', for locking and thus maintaining the contact of a conductor, as I J, from the battery M, and with such battery and with a connected electric bell or equivalent signaling device, E, and the pins or answer-conductors C, and their several connections I K, and means, as L L', for conveniently making electrical connections with the various answer conductors or pins C, as herein specified.

3. The separate sheets $a$, of paper or other non-conducting material, perforated to correspond with the conductors B C, protruding upward above the surface of the paper, as shown, in combination with the latter and with the board A, carrying questions and answers, and with the connections D, battery M, bell E, and flexible conductors I K, arranged for joint operation, as herein specified.

4. The detachable perforated sheets P, each with one or more flexibly-attached perforated pieces, $P^3$ $P^4$, in combination with the board A, pins B C, electrical connections D, adapted for joint operation relatively to each other and to the socket-pieces J and L, and suitable connections from each to a battery or source of electrical force, all substantially as herein
5 specified.

In testimony whereof I have hereunto set my hand, at New York city, New York, this 7th day of November, 1884, in the presence of two subscribing witnesses.

WALDO L. GATES.

Witnesses:
 E. L. SPENCER,
 MOSES B. MACLAY.